(12) United States Patent
Stuple et al.

(10) Patent No.: US 8,650,482 B2
(45) Date of Patent: Feb. 11, 2014

(54) DYNAMIC POSITIONING AND ALIGNING TABS RELATIVE TO MARGINS INDENT AND COLUMN WIDTH

(75) Inventors: Stuart J. Stuple, Redmond, WA (US); Robert A. Little, Redmond, WA (US); Sergey Genkin, Kirkland, WA (US); Igor Zverev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 11/304,309

(22) Filed: Dec. 14, 2005

(65) Prior Publication Data
US 2007/0136665 A1   Jun. 14, 2007

(51) Int. Cl.
*G06F 17/00*   (2006.01)
(52) U.S. Cl.
USPC ........... 715/243; 715/244; 715/245; 715/246; 715/247; 715/248; 715/249; 715/250; 715/251; 715/252; 715/253; 715/254; 715/255
(58) Field of Classification Search
USPC .................................................. 715/243–255
See application file for complete search history.

(56) References Cited

U.S. PATENT DOCUMENTS

| | | | | |
|---|---|---|---|---|
| 4,031,996 A | * | 6/1977 | Busch | 400/279 |
| 4,334,286 A | * | 6/1982 | Kerigan et al. | 715/212 |
| 4,783,760 A | * | 11/1988 | Carosso | 715/210 |
| 4,957,380 A | * | 9/1990 | Gerstle et al. | 400/279 |
| 5,214,755 A | * | 5/1993 | Mason | 715/209 |
| 5,299,303 A | * | 3/1994 | Fukunaga | 715/246 |
| 5,537,525 A | * | 7/1996 | Gotoh et al. | 715/223 |
| 5,752,058 A | | 5/1998 | Van De Vanter | 395/793 |
| 5,857,212 A | | 1/1999 | Van De Vanter | 707/519 |
| 6,144,974 A | * | 11/2000 | Gartland | 715/205 |
| 6,178,431 B1 | | 1/2001 | Douglas | 707/512 |
| 6,321,243 B1 | | 11/2001 | Ballard | 707/517 |
| 6,487,567 B1 | * | 11/2002 | Michelman et al. | 715/210 |
| 6,678,865 B1 | * | 1/2004 | Pratley et al. | 715/220 |
| 6,714,199 B1 | | 3/2004 | Beaman et al. | 345/469 |
| 6,845,373 B2 | | 1/2005 | Linhart | 707/3 |

(Continued)

FOREIGN PATENT DOCUMENTS

JP   61197271 A * 9/1986
WO   WO 2005/073872 A2   8/2005

OTHER PUBLICATIONS

Using Tabs in Microsoft Word 2003, Jul. 2004, University of Bradford, Learning Support Services, pp. 2-6.*

(Continued)

*Primary Examiner* — Doug Hutton, Jr.
*Assistant Examiner* — Zaida I Marrero
(74) *Attorney, Agent, or Firm* — Rachael Vaughn; Jim Ross; Micky Minhas

(57) ABSTRACT

Alignment and positioning of tabs in text-based applications is provided by dynamically positioning the tabs based on content, margins, page size, and indents. Tab positions are aligned relative to a size, at least one margin, or content of a document or text-containing object such as a text box. Tab positions may also be aligned relative to an indent of a paragraph or of multiple columns on the same page. Alignment properties of tab positions are carried over when text is moved to table columns or other text-containing objects. Column-like grouping of text of varying size and alignments is enabled by using multiple tabs in a single line.

16 Claims, 11 Drawing Sheets

(56) References Cited

U.S. PATENT DOCUMENTS

| | | | |
|---|---|---|---|
| 6,886,133 B2 | 4/2005 | Bailey et al. | 715/531 |
| 6,934,905 B1 | 8/2005 | Tighe | 715/500 |
| 7,024,623 B2* | 4/2006 | Higashiyama et al. | 715/245 |
| 7,093,196 B1* | 8/2006 | Griffiths et al. | 715/246 |
| 7,360,157 B1* | 4/2008 | Yalovsky | 715/256 |
| 7,400,420 B2* | 7/2008 | Kageyama et al. | 358/1.13 |
| 2002/0032705 A1* | 3/2002 | Higashiyama et al. | 707/530 |
| 2005/0041993 A1* | 2/2005 | Barry et al. | 399/127 |
| 2005/0097458 A1* | 5/2005 | Wilson | 715/517 |
| 2005/0216922 A1 | 9/2005 | Mogilevsky et al. | 719/328 |
| 2006/0107225 A1* | 5/2006 | Jones et al. | 715/764 |
| 2007/0035421 A1* | 2/2007 | Meijer et al. | 341/51 |

OTHER PUBLICATIONS

"Typographical Features of the Cocoa Text System"; 5 pgs.; http:developer.apple.com/documentation/Cocoa/Conceptual/TextArchitecture/Concepts//TextSystemFeatures.html.

"WorldType™ Layout Engine"; 2 pgs.; http://www.monotypeimaging.com/ce/WTdatasheet_lores.pdf.

"Microsoft Typography"; OpenType development (1 of 5):; 4 pgs.; http://www.microsoft.com/typogrophy/OpenTypeDevIntro.mspx.

* cited by examiner

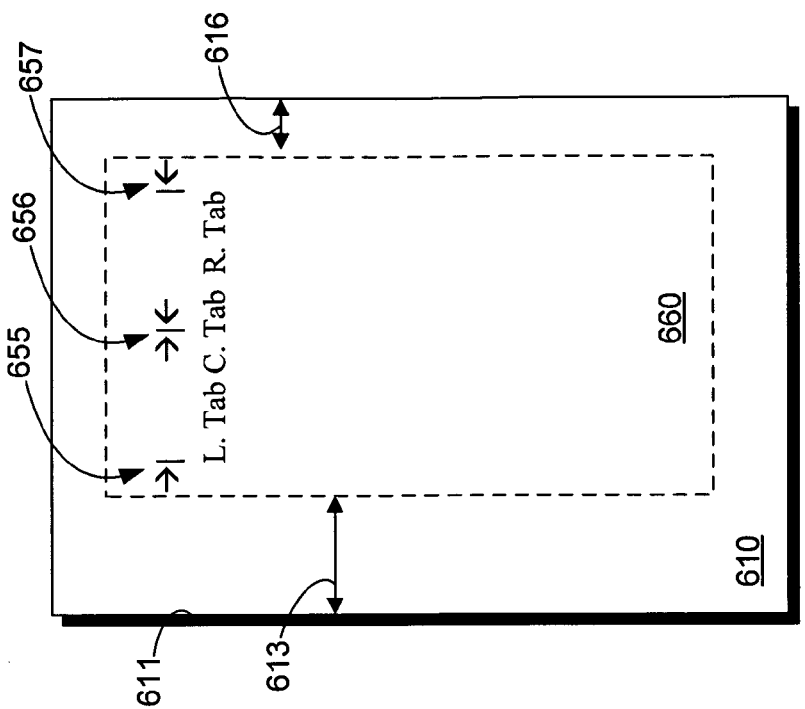
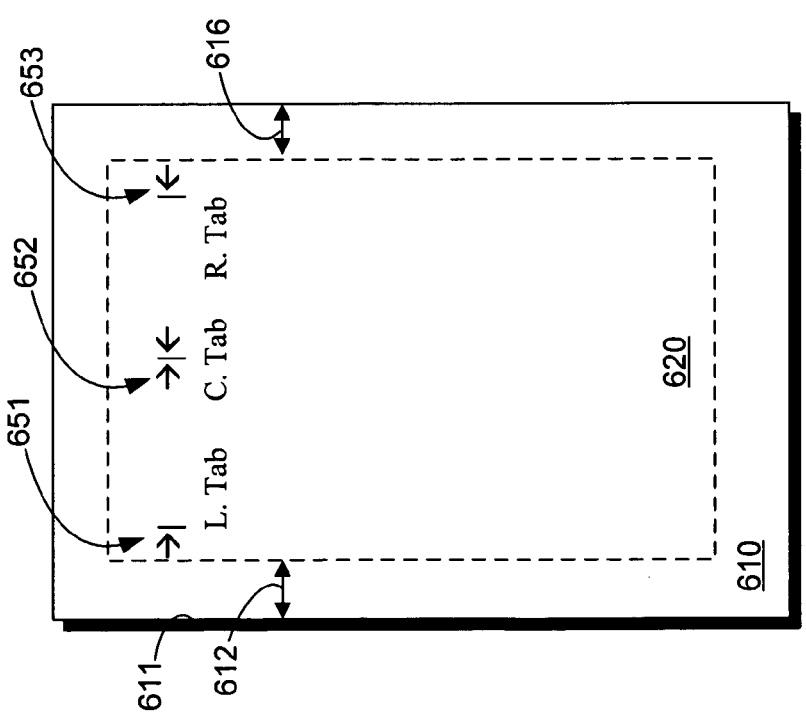
Fig. 6

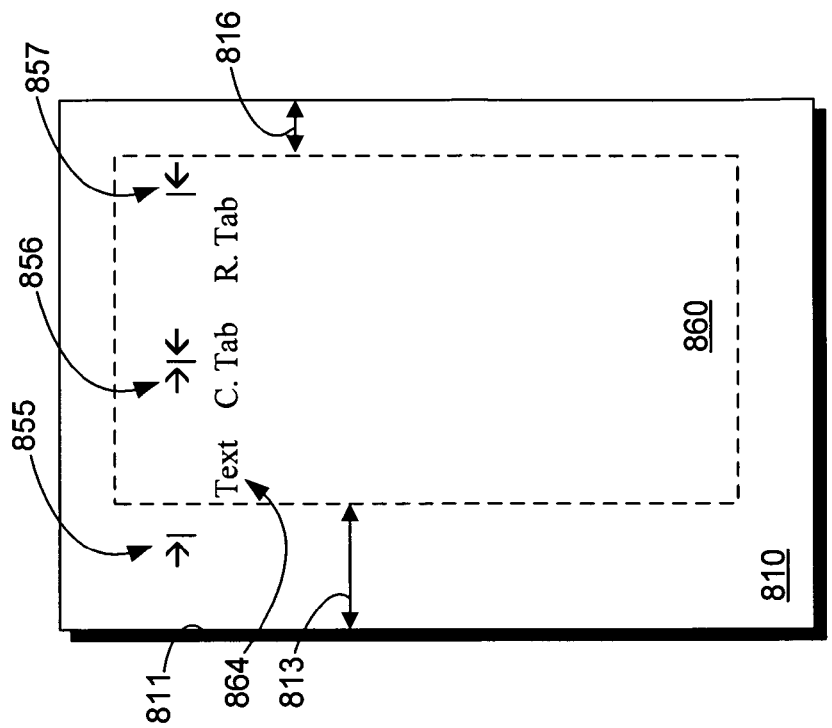
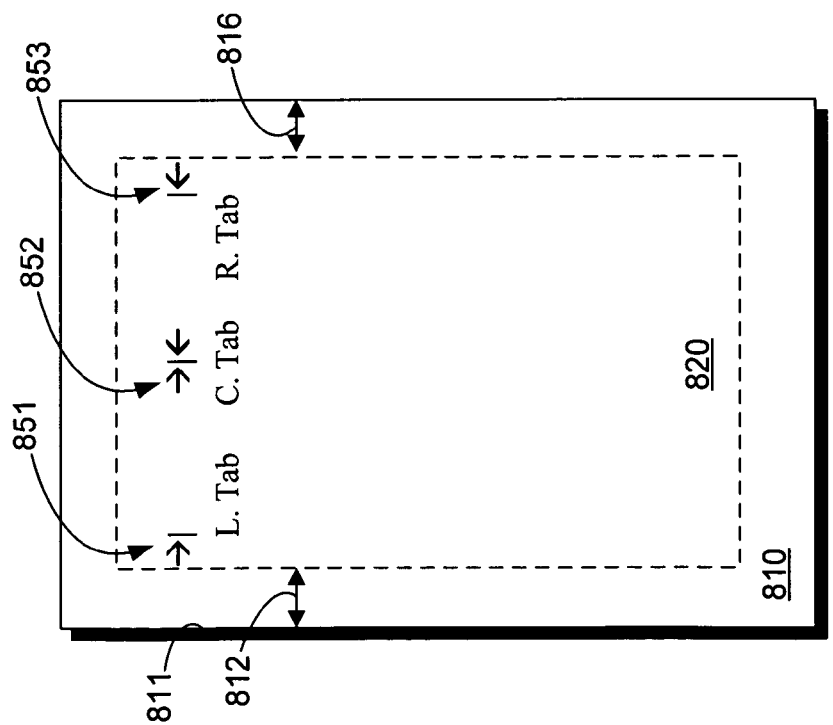
Fig. 8

DYNAMIC POSITIONING AND ALIGNING TABS RELATIVE TO MARGINS INDENT AND COLUMN WIDTH

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

Many users of such software applications are enabled to prepare professional quality documents, presentations, and the like, without having a professional services company do the work for them. While word processing and slide presentation applications have an increasing variety of options for text and other data placement and presentation, some aspects still remain restrictive. For example, many applications dealing with text have limited alignment and positioning capabilities.

Tabs are one of the features used in word processing and similar applications for positioning text within a page or a slide. Current technology provides an absolute position for the tabs relative to the page they are on. This may result in undesirable text positioning if features of the page such as margins, indents, or orientation of the page are modified. For example, on an 8.5" wide page with 1.25" left and right margins, left/center/right tab positions from the left margin may be 1.25"/4.25"/7.25". Because these positions are relative to a left margin of the page, the tab positions may become 1"/4.125"/7" from the left margin if the margins are changed to 1".

In addition, tab positions may be modified in an undesirable manner when text blocks such as paragraphs are copied or moved from one application to another, for example, from a word processing document to a slide presentation or an electronic mail document.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Aspects are directed to improved tab alignment and positioning for applications dealing with text such as word processing applications, slide presentations, electronic mail applications, and the like, by dynamically positioning tabs based on content. Tab positions may be aligned relative to at least two margins of a document or text-containing object such as a text box. According to further aspects, tab positions may also be aligned relative to an indent of a paragraph. Alignment properties of tab positions may be carried over when text is moved to another document or table columns.

A plurality of center tabs, as well as left- and right-aligned tabs, may be utilized within a single line enabling column-like text organization on a page without generating distinct columns. Tab positions and alignment may be preserved when at least one of a page size, a margin, an indent, and a page orientation is modified. Furthermore, tab positions and alignment may also be preserved when content is modified by adding or removing text, objects, images, and the like.

These and other features and advantages, which characterize aspects of the present disclosure, will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates effects of tab positions being aligned to the page margins of a document page when a page margin is modified;

FIG. 8 illustrates effects of tab positions being aligned to the page margins of a document page when a page margin is modified;

DETAILED DESCRIPTION

As briefly described above, embodiments are directed to positioning and aligning of tabs relative to a margin or an indent in a text-based application. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
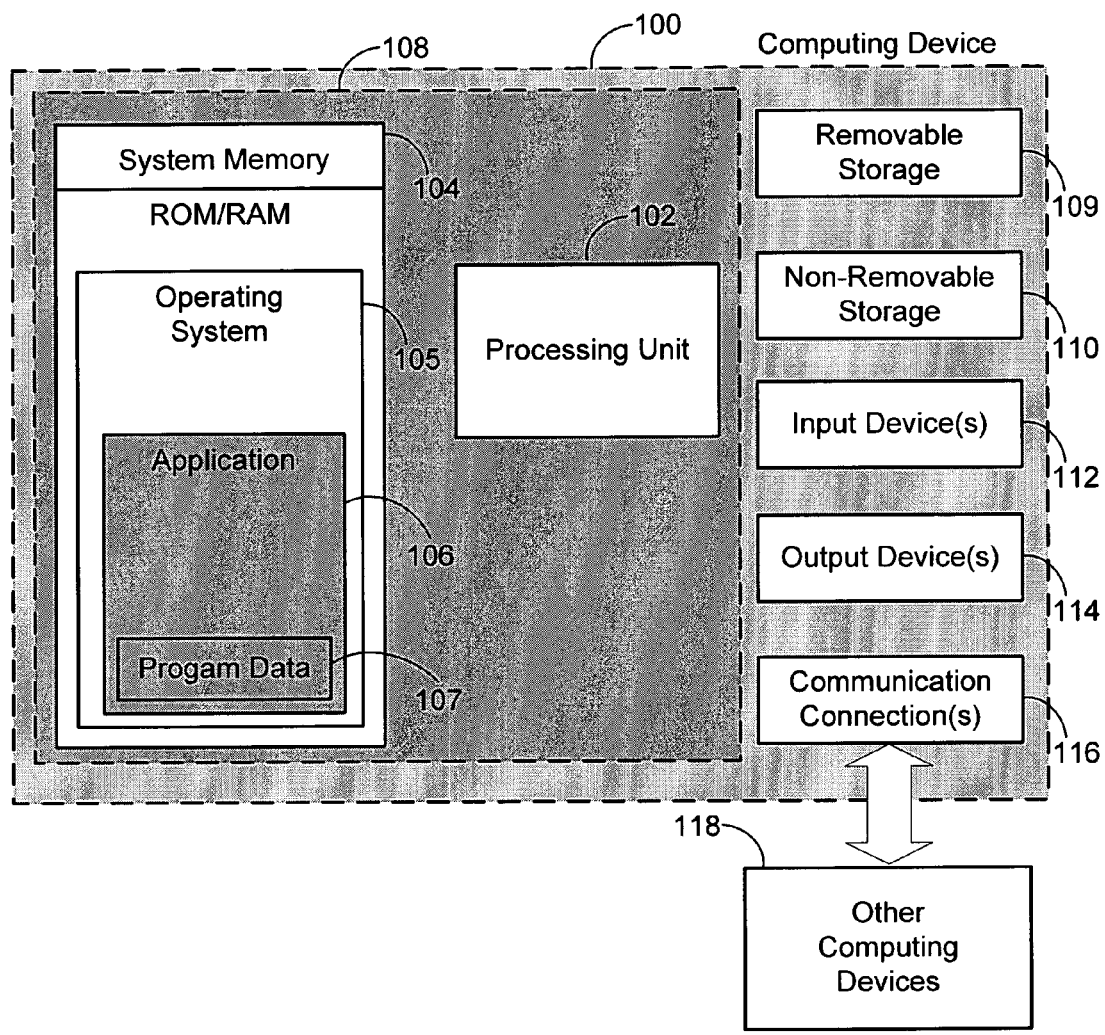
FIG. 1 is a block diagram of an exemplary computing operating environment.

Referring now to the drawings, in which like numerals refer to like elements through the several figures, aspects and an exemplary computing operating environment will be described. FIG. 1 and the following discussion are intended to provide a brief, general description of a suitable computing environment in which the invention may be implemented.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

With reference to FIG. 1, one exemplary system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as application 106, and may include program data 107. This basic configuration is illustrated in FIG. 1 by those components within dashed line 108.

According to embodiments, the application 106 may comprise many types of programs, such as a word processing program, a slide presentation program, an Internet browsing program, a calendar program, an electronic mail program, and the like. An example of such programs is WORD® manufactured by MICROSOFT CORPORATION. The application 106 may also comprise a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, or program module.

Figure 2A:
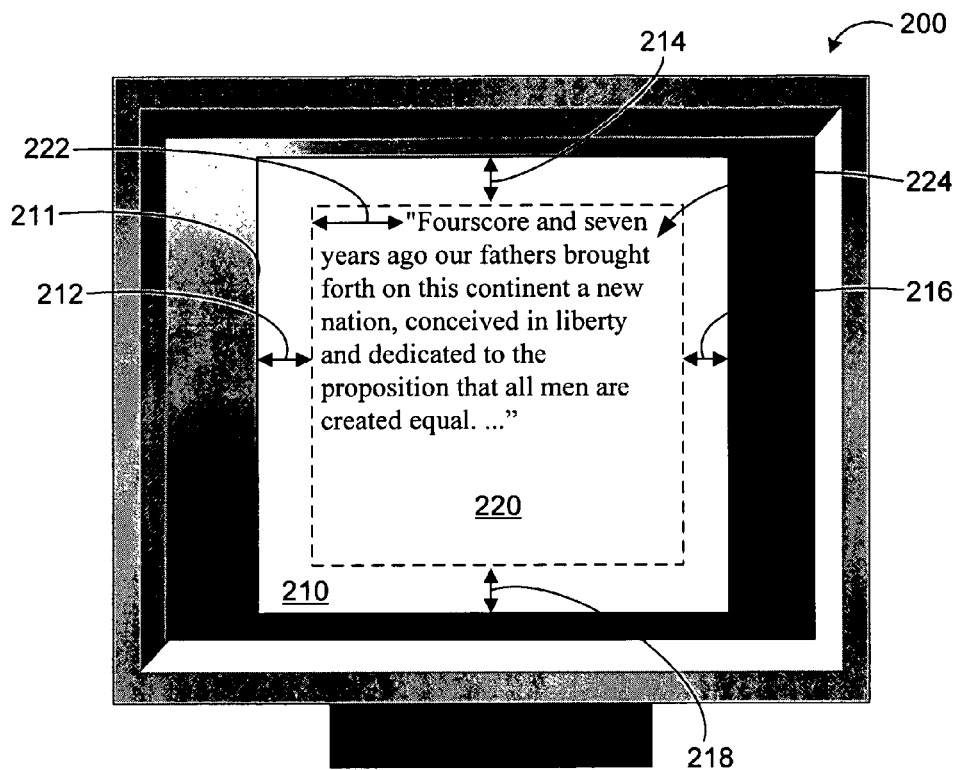
FIGS. 2A and 2B illustrate properties of a document page such as margins, indents, and the like on a computer screen display for two different page orientations.
Figure 2B:
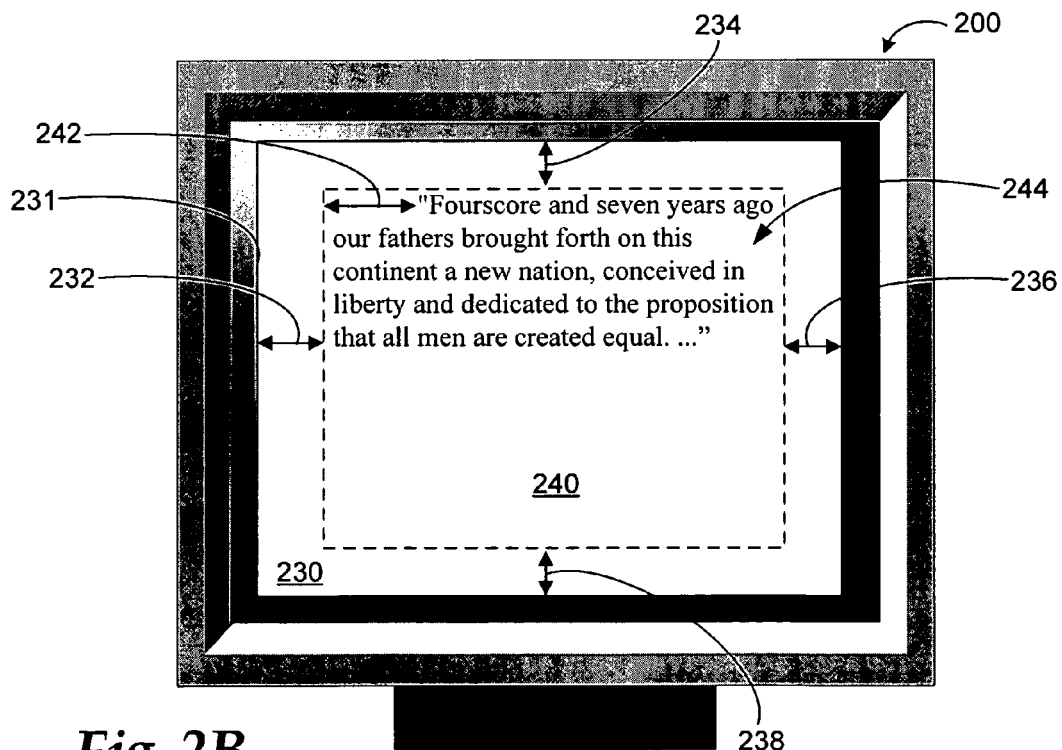

Referring to FIGS. 2A and 2B, properties of a document page such as margins, indents, and the like, are illustrated on a computer screen display for two different page orientations.

Document page 210, shown on computer screen display 200 in FIG. 2A, may be a page generated by an application such as application 106 of FIG. 1. As shown in the figure, page 210 is in portrait (vertical) position. Positioning of text within page 210, such as paragraph 224, is limited to text area 220. Text area 220 is defined by left margin 212, top margin 214, right margin 216, and bottom margin 218. Left margin 212 determines a distance of text area 220 from a left border 211 of page 210. Similarly, top margin 214, right margin 216, and bottom margin 218 determine a distance of the text from top, right, and bottom borders of page 210, respectively. Indent 222 determines a starting point of the first line of paragraph 224 in relation to left margin 212.

FIG. 2B illustrates page 230 in landscape (horizontal) position shown on the same computer screen display. Text area 240 of page 230 is defined similarly by left margin 232, top margin 234, right margin 236, and bottom margin 238. If the page orientation is modified from portrait to landscape (or vice versa) by a user or automatically by the application, the margins may be preserved or adjusted according to a preset preference. Thus, left margin 232, top margin 234, right margin 236, and bottom margin 238 may be the same as left margin 212, top margin 214, right margin 216, and bottom margin 218 when the same page is reoriented. Alternatively, the margins may be adjusted to fit document properties. Similarly, indent 242 may be preserved or adjusted according to document properties.

Figure 3:
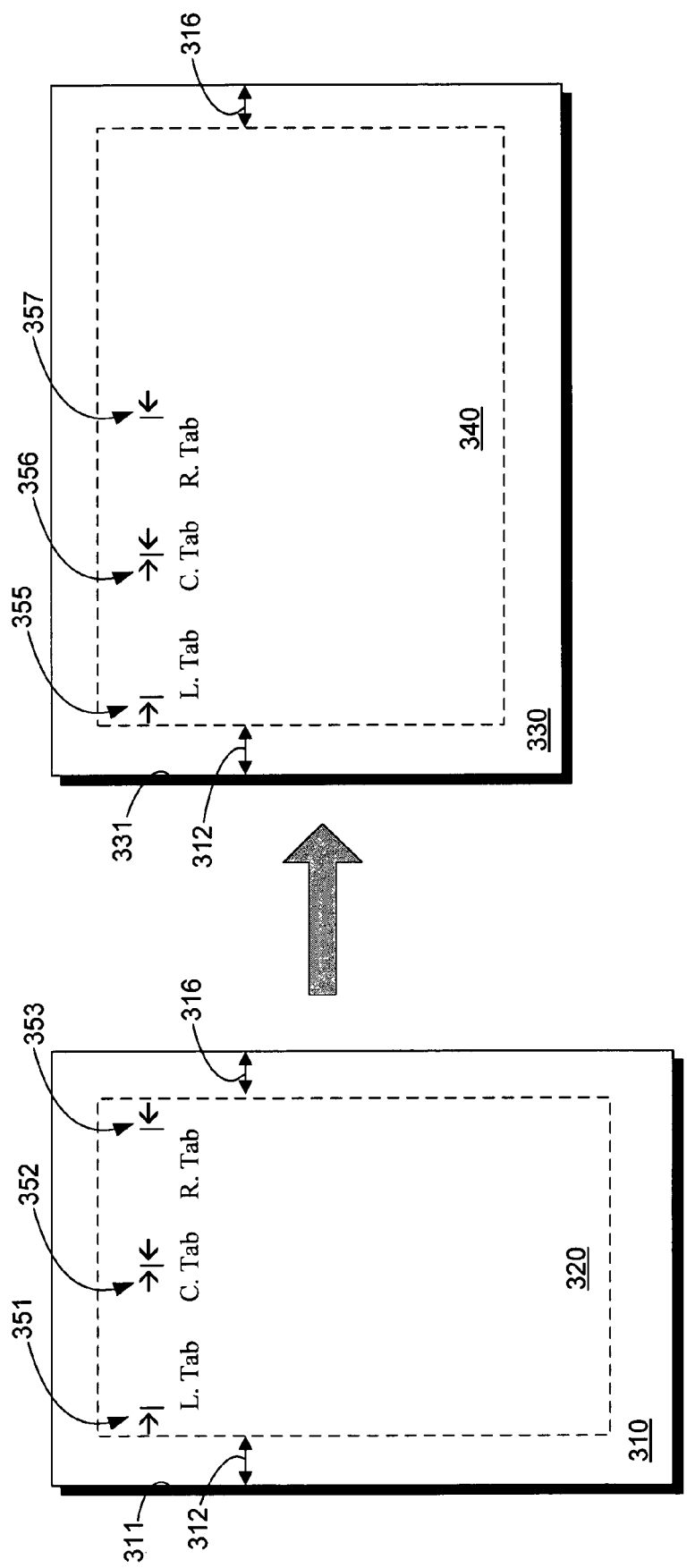
FIG. 3 illustrates effects of tab positions being aligned to a left margin of a document page when a page orientation is modified from portrait to landscape.

Now referring to FIG. 3, effects of tab positions being aligned to a left margin of a document page are illustrated when a page orientation is modified from portrait to landscape.

As mentioned previously, tab positions and alignments are commonly referenced to a left margin of the document page. Text area 320 of page 310 is defined laterally by left margin 312 and right margin 316. According to prior methods, left-aligned tab 351, center-aligned tab 352, and right-aligned tab 353 are all referenced from left margin 312 of page 310 regardless of their alignment properties. Thus, text starting at the insertion point of left-aligned tab 351 begins at the insertion point and runs to the right of the tab position. A distance of the tab insertion point from left margin 312 may be user-defined or according to a default value.

Text starting at the insertion point of center-aligned tab 352 begins at the insertion point and runs to the left and right of the tab position such that the text is centered around the tab position. The tab insertion point is again determined from the left margin 312 by a user-defined distance or a default distance.

The third variety is right-aligned tab 353. Text starting at the insertion point of right-aligned tab 353 begins at the insertion point and runs to the left of the tab position. The tab insertion point is still determined from the left margin 312 by a user-defined distance or a default distance.

In addition to the left-, center-, and right-aligned tabs, other tab styles may also be implemented. For example, a decimal tab aligns numbers around a decimal point. Independent of the number of digits, the decimal point is place in the same position. A bar tab does not position text. It inserts a vertical bar at the tab position.

Page 330 of FIG. 3 shows a landscape-oriented version of page 310 with the margins preserved. Although the margins are preserved, tab positions of left-aligned tab 355, center-aligned tab 356, and right-aligned tab 357 are now different in relation to text area 340. Because the tab positions are referenced to left margin 312, their distance is not preserved to the right margin 316 or any other reference point on page 330.

Figure 4:
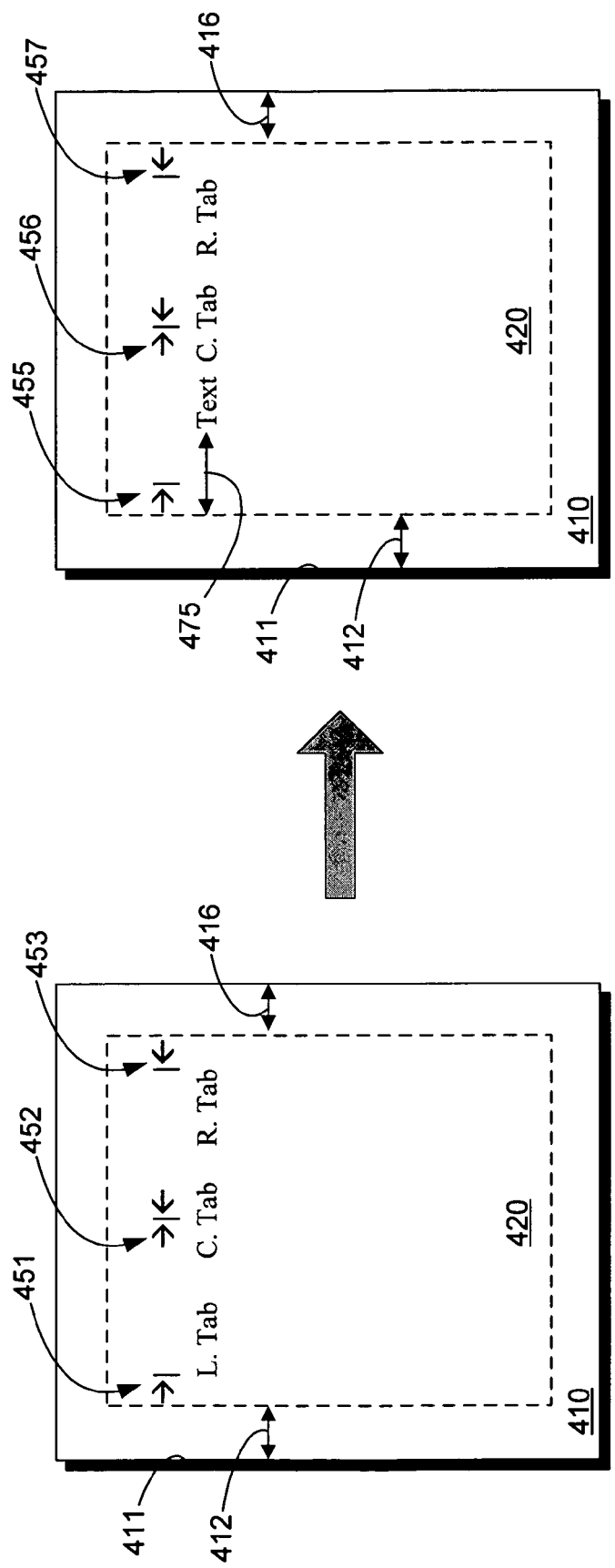
FIG. 4 illustrates effects of tab positions being aligned to a left margin of a document page when a paragraph indent is modified.

FIG. 4 illustrates effects of tab positions being aligned to a left margin of a document page when a paragraph indent is modified. Page 410 of FIG. 4 is in portrait orientation and includes text area 420, left margin 412, right margin 416, left margin 412 that acts as reference to margins and tabs, left-aligned tab 451, center-aligned tab 452, and right-aligned tab 453. Elements of page 410 that are similarly numbered as elements of page 310 of FIG. 3 have the same properties.

In FIG. 4, page 410 is modified by inserting indent 475 such that text in a first line of a paragraph in text area 420 starts at a point defined by the indent referenced to left margin 412. Indent 475 may also be referenced to left border 411. Because, the tab positions are referenced to left margin 412 and not to the margins, their positions within text area 420 relative to indent 475 are not preserved. Accordingly, left-aligned tab 455 remains to the left of indent 475. Thus, text beginning at the indent is no longer associated with left-aligned tab 455.

The centered position of center-aligned tab 456 is also modified and text beginning at center-aligned tab 456 is no longer centered in the first line of the paragraph. A similar effect may be observed with right-aligned tab 457, whereby a position and an alignment of text at right-aligned tab 457 may no longer be defined by that tab due to the inserted indent.

Position and alignment changes of text based on left border referenced tabs are not limited to the examples described above in FIGS. 3, 4, and 5, however. Many other position and alignment changes of text based on tab positions may be observed when tabs have an absolute position relative to a left (or right) margin of a document page.

Figure 5:
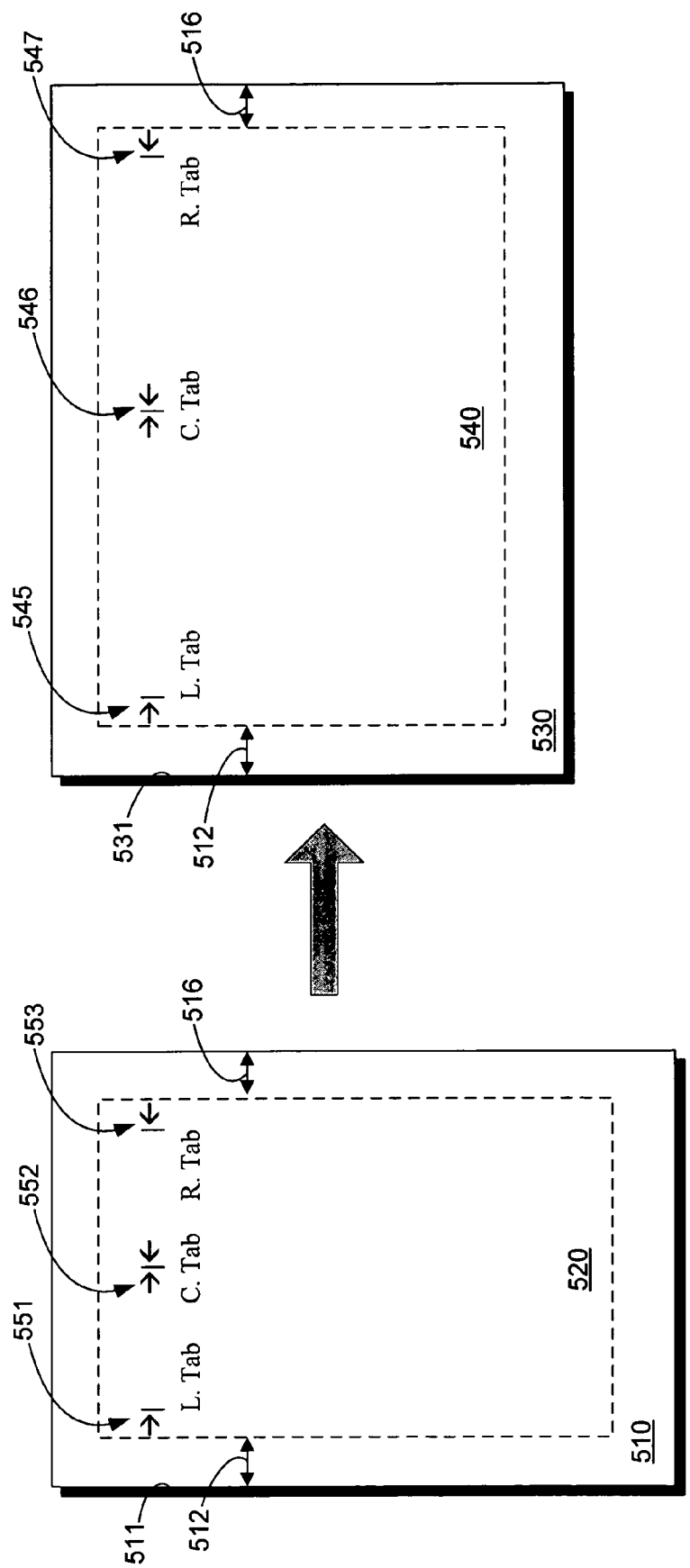
FIG. 5 illustrates effects of tab positions being aligned to a left margin of a document page when a page orientation is modified from portrait to landscape.

Referring to FIG. 5, effects of tab positions being aligned to the page margins of a document page according to one embodiment are illustrated when a page orientation is modified from portrait to landscape.

Page 510 of FIG. 5 is in portrait orientation and includes text area 520, left margin 512, right margin 516, left border 511, left-aligned tab 551, center-aligned tab 552, and right-aligned tab 553. In one embodiment, left margin 512 may be the reference margin. In another embodiment, right margin 516 may be the reference margin. In a further embodiment, both margins may act as references for different tab positions.

Moreover, the tab position may be determined based on a location of the insertion point relative to a horizontal center point of the paragraph. When page 510 is modified to landscape-oriented page 530, left margin 512 and right margin 516 are preserved.

According to one embodiment, center-aligned tab 546 is referenced from left margin 512 and right margin 516. Therefore, text beginning at the center-aligned tab 546 has the same distance to both margins as in page 510, and is center aligned as illustrated. In yet another embodiment, right-aligned tab 547 is referenced from right margin 516. Therefore, text beginning at the right-aligned tab 547 has the same distance to the right margin as in page 510, and is right aligned. By preserving relative positions and alignment of the tabs, a look-and-feel of the text is maintained when the page orientation is changed.

If a tab according to one of the embodiments is inserted into a paragraph that already includes another tab referenced to a left border of the page, a potential layout of additional content associated with the new tab may be determined for each of the reference points (e.g. left margin, right margin, indent) and one of the reference points selected such that a collision between the additional content and existing content is avoided. Furthermore, if a center-aligned tab is inserted into a paragraph beyond a horizontal center point of the paragraph, the center-aligned tab may be ignored.

FIG. 6 illustrates effects of tab positions being aligned to the page margins of a document page when a page margin is modified, according to some embodiments.

Page 610 of FIG. 6 is in portrait orientation and includes text area 620, left margin 612, right margin 616, left border 611, left-aligned tab 651, center-aligned tab 652, and right-aligned tab 653. The tabs of page 610 are referenced from the combination of the two margins as described above.

When page 610 is modified by increasing left margin 612 to new left margin 613, left-aligned tab 655, center-aligned tab 656, and right-aligned tab 657 are preserved by their relative reference to one or both of the margins. Accordingly, text position and alignment properties are preserved within new text area 660 maintaining a look-and-feel of the text.

Figure 7:
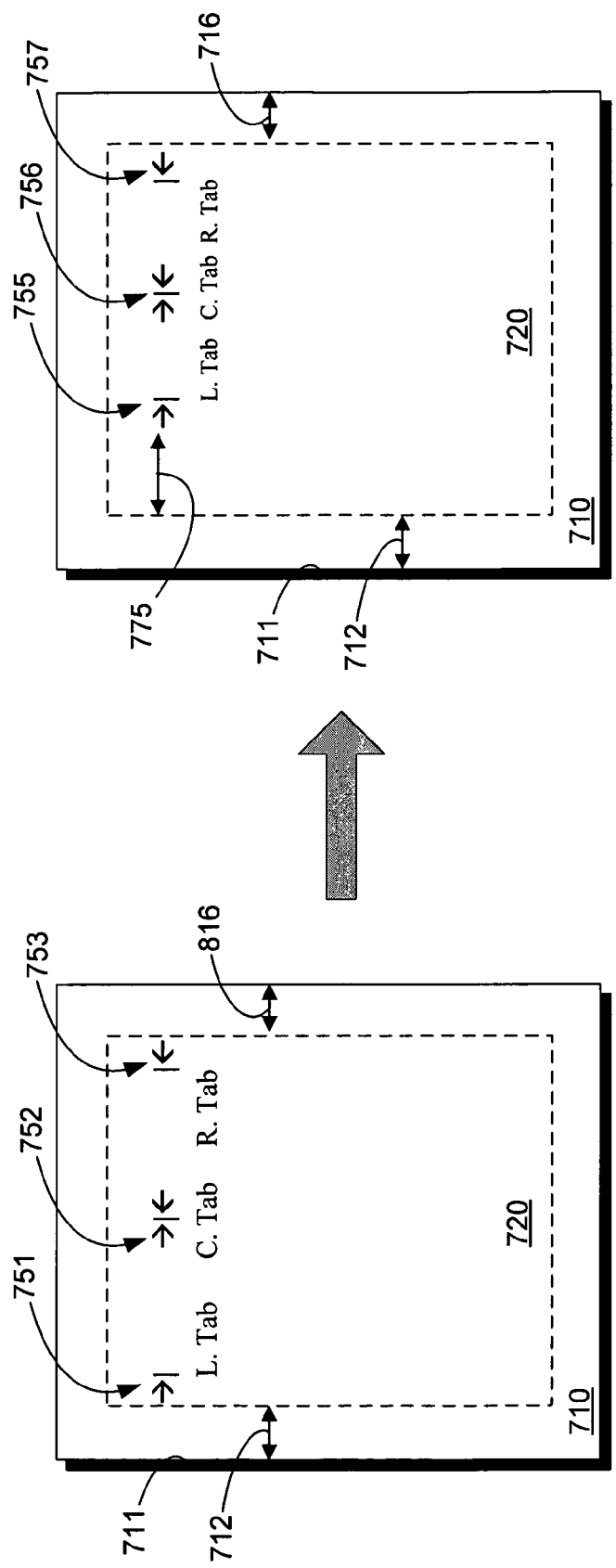
FIG. 7 illustrates effects of tab positions being aligned to the page margins of a document page when a paragraph indent is modified.

Referring to FIG. 7, effects of tab positions being aligned to the page margins of a document page are illustrated when a paragraph indent is modified.

Page 710 of FIG. 7 is in portrait orientation and includes text area 720, left margin 712, right margin 716, left border 711, left-aligned tab 751, center-aligned tab 752, and right-aligned tab 753.

When page 710 is modified by inserting indent 775 to the first line of a paragraph in text area 720, left-aligned tab 755, center-aligned tab 756, and right-aligned tab 757 are referenced in relation to the new indent. Thus, positions of all three tabs are preserved relative to indent 775 in the new first line. By preserving position and alignment of text with the new indent, a look-and-feel of the text is again maintained.

FIG. 8 illustrates effects of tab positions being aligned to a document page according to one embodiment when a page margin is modified. Page 810 of FIG. 8 is in portrait orientation and includes text area 820, left margin 812 that acts as reference to margins and tabs, right margin 816, left border 811, left-aligned tab 851, center-aligned tab 852, and right-aligned tab 853.

In FIG. 8, page 810 is modified by increasing the left margin such that text area 860 is defined by the larger left margin 813 referenced to left border 811. Because, the tab positions are referenced to the borders and not to the relative positions of both left and right margins, their positions within page 810 relative to left border 811 are preserved. Accordingly, right-aligned tab 857 may be outside the text area 860 in the transformed page. Text beginning at center-aligned tab 856 is no longer positioned about a middle of the line in text area 860, although it may still be centered around the tab insertion position.

Embodiments are not limited to the position and alignment changes described above in FIGS. 6, 7, and 8, however. Many other position and alignment changes of text based on tab positions may be preserved employing tab positions referenced to margins and/or paragraph indents. Furthermore, embodiments are not limited to text content only. Content of documents may include images, objects, or combinations in addition to text.

Figure 9:
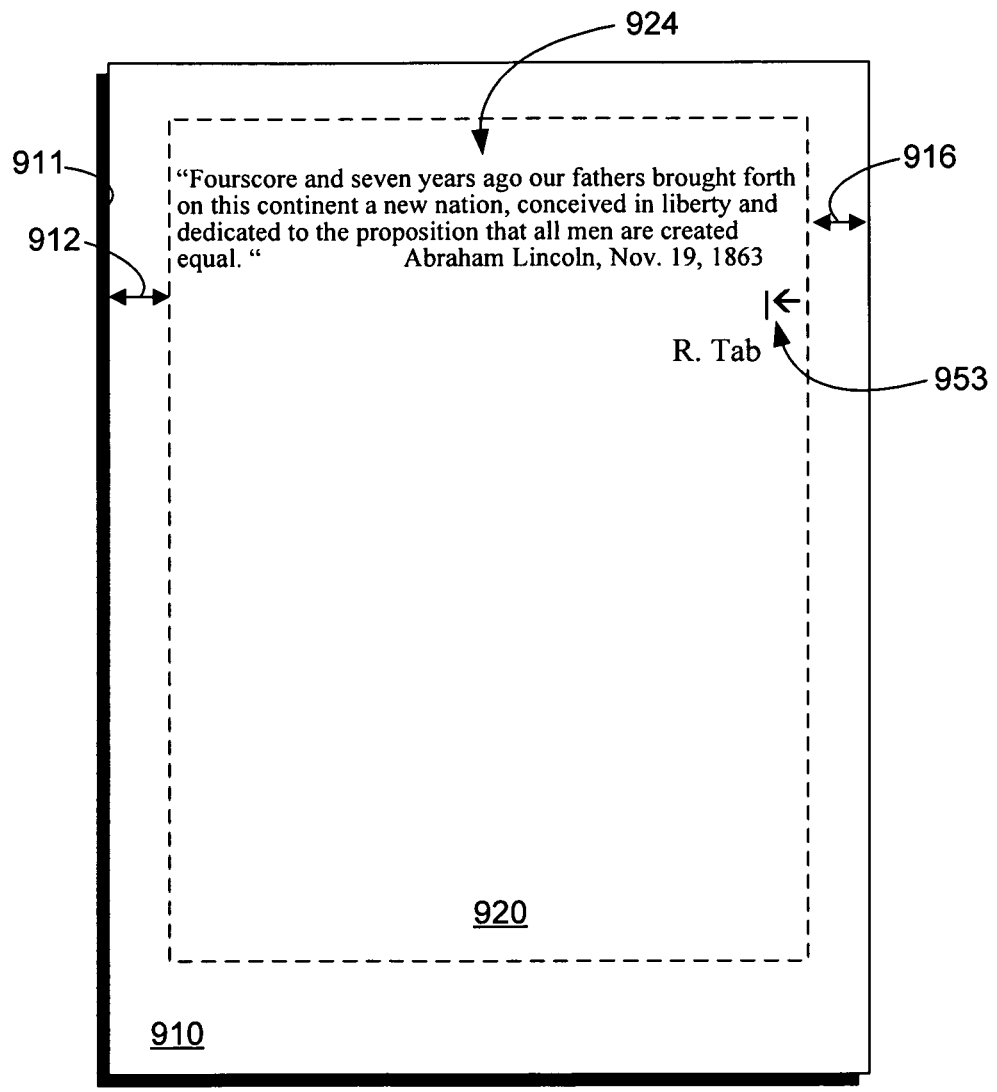
FIG. 9 illustrates an example use of a right tab position aligned to a right page margin of a document page according to one embodiment.

FIG. 9 illustrates an example use of a right tab position aligned to a right page margin of a document page according to one embodiment. While left-center-, and right-aligned tabs are commonly used in headers and footers of documents, another use of right-aligned tabs is in quotations. When a known source is quoted, it is common practice to list the source at the end of the quote aligned to a right border of the page.

Page 910 of FIG. 9 shows example paragraph 924. As shown in the figure, source and date are right aligned at the end of the quote in text area 920 defined by margins 912 and 916. When right-aligned tab 953 is referenced from left border 911, as in prior methods, the source (name and date) may run over to the next line or lose its relative position in response to a change in page size, page orientation, margins, or insertion of an indent.

With a right-aligned tab 953 that is referenced to right margin 916, the source information may be right aligned regardless of any of the changes listed above. If additional content is inserted, the right-aligned tab along with its properties is pushed to the next line preserving a look-and-feel integrity of the paragraph.

Embodiments are not limited to the example paragraph style described above. Other styles of text such as lists, groupings, and the like, may be generated using the principles described herein.

Figure 10:
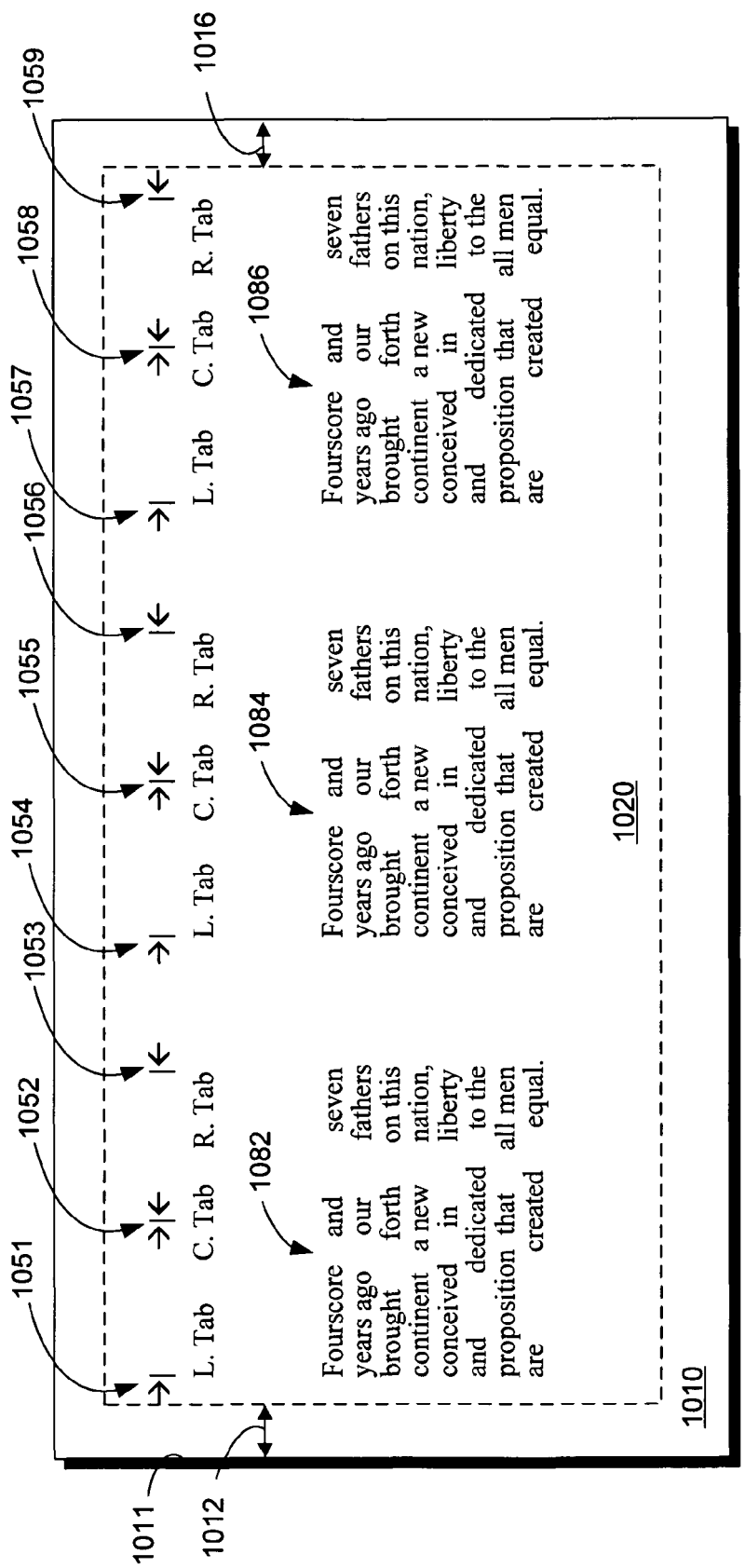
FIG. 10 illustrates column-like organization of text using multiple tab left, right, and center tab positions in each line.

FIG. 10 illustrates column-like organization of text using multiple left, right, and center tab positions in each line according to another embodiment. In some applications such as slide presentations, users may desire to organize text in unconventional groupings such as column-like structures with differing sizes and alignments. Page 1010 of FIG. 10 shows such an implementation.

Similar to the pages illustrated previously, page 1010 includes left and right margins 1012 and 1016 defining horizontal limits of text area 1020. Text within text area 1020 is organized in three column-like groupings using three kinds of tabs. Left-aligned tab 1051, center-aligned tab 1052, and right aligned tab 1053 determine positions and alignments for the first text group 1082. Second text group 1084 is similarly laid out next to first text group 1082 using left-aligned tab 1054, center-aligned tab 1055, and right aligned tab 1056. Third text group 1086 is also laid out in a similar manner using left-aligned tab 1057, center-aligned tab 1058, and right aligned tab 1059.

Using multiple tabs of different alignments in each line enables the group text layout without resorting to tables or text boxes. When the tabs are referenced to margins, a change in page size or orientation may not affect the layout of the text groups relative to each other. When the tabs are referenced relative to the indents, a change in page size or orientation may affect the layout of the text groups relative to each other while maintaining the positioning of the text within each group relative to that group's boundaries. While text groups 1082, 1086, and 1088 are shown in similar size and layout, embodiments are not so limited. Using different positions or types of tabs, text groups of various sizes and alignments may be laid out together.

In the figures above, left-, center-, and right-aligned tabs have been shown in documents in the same order. For clarification purposes, the left-, right-, and center-terms refer to an alignment of text from the tab positions and not to the position of the tab relative to the page. Therefore, it should not be construed that a left-aligned tab can only be positioned to the left of a center-aligned tab, etc. The alignment of the tabs may be selected as desired by the user. Some embodiments provide for preservation of a look and feel of text with respect to tab positions, but do not limit selection of tab alignments in relation to a tab position.

Figure 11:
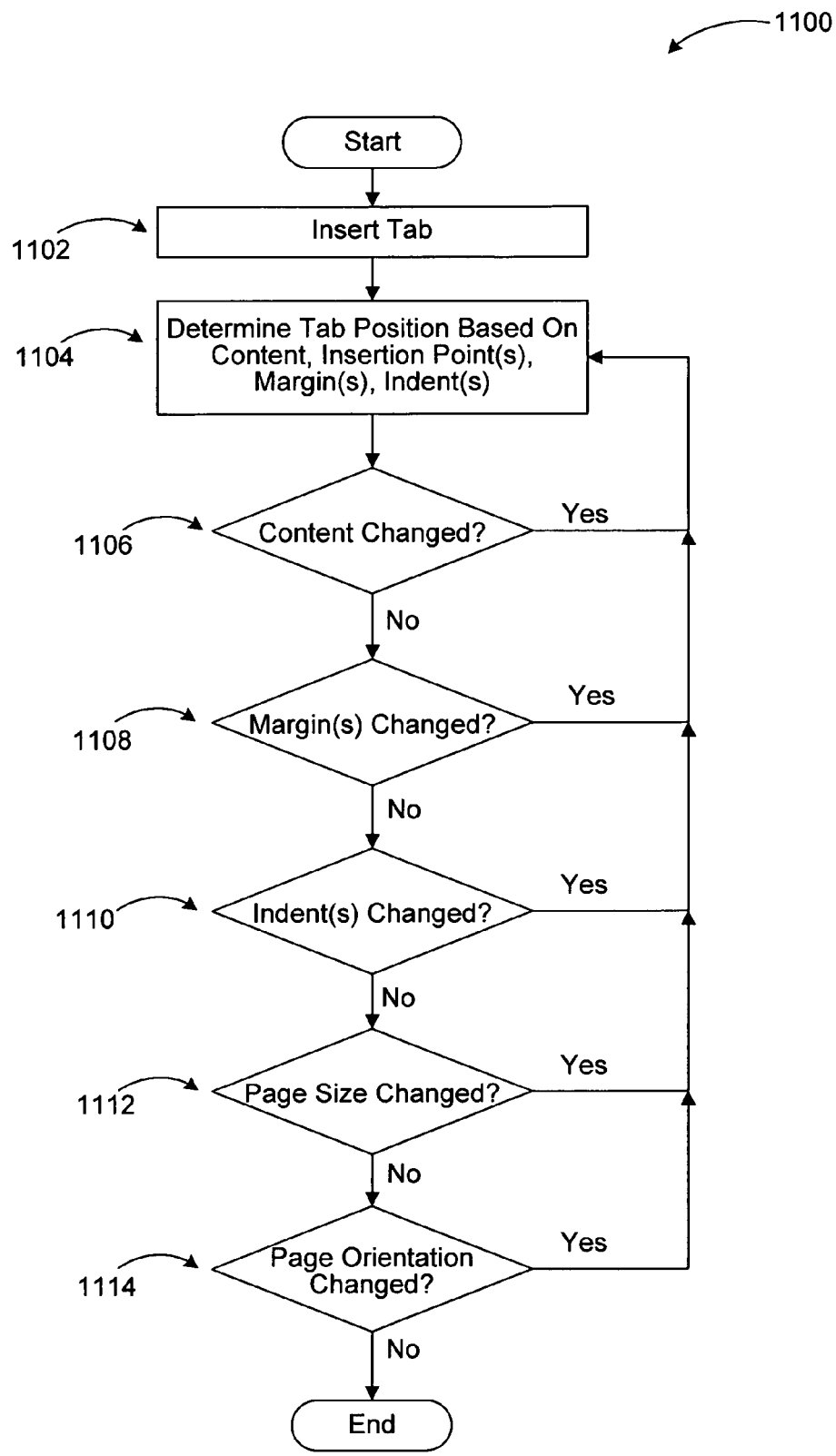
FIG. 11 illustrates a flowchart of a process for positioning and aligning a tab relative to a margin or an indent.

FIG. 11 illustrates a flowchart of process 1100 for positioning and aligning a tab relative to a margin or an indent. Process 1100 may be implemented in an application like a word processing program, a slide presentation program, an Internet browsing program, a calendar program, an electronic mail program, and the like.

Process 1100 begins with operation 1102, where a tab insertion point is received in a word processing or similar application. Processing moves next to operation 1104.

At operation 1104, a position of the tab is determined based on at least one of the insertion point, type of alignment specified for the tab, content surrounding the insertion point, page margins, or an indent of the paragraph (if any). Content being inserted at the tab is positioned according to the determined tab position and aligned according to the alignment property of the tab as described previously. Processing advances from operation 1104 to decision operation 1106.

At decision operation 1106, a determination is made whether content surrounding the tab position has changed. Change in content may include addition or removal of text, images, objects, and the like, around the tab position. If content has changed, processing returns to operation 1104 for further determination of the tab position. If content has not changed, processing moves to decision operation 1108.

At decision operation 1108, a determination is made whether one or more margins of the page have changed. Change in margin(s) may include increase or decrease of one or both of the lateral margins. Change of margins may further include reduction of text area due to movement of text from a page to a table, text box, and the like. If at least one of the margins has changed, processing returns to operation 1104 for further determination of the tab position. If the margins have not changed, processing moves to decision operation 1110.

At decision operation 1110, a determination is made whether an indent in the paragraph to which the tab belongs has changed. Change of the indent may include increase, decrease, insertion, or removal of the indent. If the indent has changed, processing returns to operation 1104 for further determination of the tab position. Otherwise, processing moves to decision operation 1112.

At decision operation 1112, a determination is made whether the page size has changed. Change of the page size may include decrease or increase of horizontal limits of the page that may result in shifting of content and tab positions. If the page size has changed, processing returns to operation 1104 for further determination of the tab position. If the page size has not changed, processing moves to decision operation 1114.

At decision operation 1114, a determination is made whether a page orientation has changed. Change of the page orientation may include reorienting page from portrait to landscape, landscape to portrait, and the like. If the page orientation has changed, processing returns to operation 1104 for further determination of the tab position. Otherwise, dynamic modification of the tab position is complete and processing proceeds to a calling process for further actions.

The operations included in process 1100 are for illustration purposes. Positioning and aligning a tab relative to a margin or an indent may be implemented by a similar process with fewer or additional steps, as well as in different order of operations. Furthermore, embodiments may be implemented similarly for left-to-right (LTR) languages (e.g. English) as well as for right-to-left (RTL) languages (e.g. Arabic) using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for positioning content in an electronic document using a tab, comprising:
    receiving an insertion point for the tab on a page in the electronic document, the page in the electronic document having a first orientation, a first margin, and a first page dimension, the tab having an alignment property and a text position for content;
    determining a first tab position relative to one of: the insertion point, content surrounding the insertion point, at least two page margins, or an indent of a paragraph;
    positioning content associated with the first tab position and aligning the content in accordance with the alignment property of the tab; and
    in response to detecting a change in the first orientation, one of the at least two page margins, or the first page dimension of the electronic document:
        dynamically determining a second tab position relative to one of the insertion point, the content surrounding the insertion point, the at least two page margins, or the indent of the paragraph, as modified by the change detected in the first orientation, the one of the at least two page margins, or the first page dimension of the electronic document, and
        moving the tab to the second tab position,
        wherein the text position and the alignment property of the content are preserved after moving the tab to the second tab position.

2. The computer-implemented method of claim 1, further comprising:
    dynamically modifying the second tab position in response to a change of a content of the paragraph.

3. The computer-implemented method of claim 2, whereby at least one of:
    a left margin of the page and the indent of the paragraph provide a reference point for the second tab position such that the text position and the alignment property of the content are preserved in the electronic document.

4. The computer-implemented method of claim 1, further comprising:
    carrying over the second tab position to a new line, if content is added before the second tab position such that a right margin of the page is reached.

5. The computer-implemented method of claim 1, whereby the tab includes one of: a dynamically left-aligned tab, a dynamically center-aligned tab, and a dynamically right-aligned tab.

6. A computer-implemented method for positioning content in an electronic document using a tab, comprising:
    receiving an insertion point for the tab on a page in the electronic document, the page in the electronic document having a first orientation, a first margin, and a first page dimension, the tab having an alignment property and a text position for content, wherein the content includes at least one of: text, an image, and an object;
    determining a first tab position relative to one of: the insertion point, content surrounding the insertion point, at least two page margins, or an indent of a paragraph;
    positioning content associated with the first tab position and aligning the content in accordance with the alignment property of the tab; and
    in response to detecting a change in the first orientation, one of the at least two page margins, or the first page dimension of the electronic document:
        dynamically determining a second tab position relative to one of the insertion point, the content surrounding the insertion point, the at least two page margins, or the indent of the paragraph, as modified by the change detected in the first orientation, the one of the at least two page margins, or the first page dimension of the electronic document, and
        moving the tab to the second tab position,
        wherein the text position and the alignment property of the content are preserved after moving the tab to the second tab position.

7. The computer-implemented method of claim 6, further comprising:
    dynamically modifying the second tab position in response to a change of the content of the paragraph.

8. The computer-implemented method of claim 7, whereby at least one of:
    a left margin of the page and the indent of the paragraph provide a reference point for the second tab position and the alignment property of the content are preserved in the electronic document.

9. The computer-implemented method of claim 6, further comprising:
    carrying over the second tab position to a new line, if content is added before the second tab position such that a right margin of the page is reached.

10. The computer-implemented method of claim 6, whereby the tab includes one of: a dynamically left-aligned tab, a dynamically center-aligned tab, and a dynamically right-aligned tab.

11. A computer-implemented method for positioning content in an electronic document using a tab, comprising:
    receiving an insertion point for the tab on a page in the electronic document, the page in the electronic document having a first orientation, a first margin, and a first page dimension, the tab having an alignment property and a text position for content;
    determining a first tab position relative to one of: the insertion point, content surrounding the insertion point, at least two page margins, or an indent of a paragraph;
    positioning content associated with the first tab position and aligning the content in accordance with the alignment property of the tab; and
    in response to detecting a change in the first orientation, one of the at least two page margins, or the first page dimension of the electronic document:

dynamically determining a second tab position relative to one of the insertion point, the content surrounding the insertion point, the at least two page margins, or the indent of the paragraph, as modified by the change detected in the first orientation, the one of the at least two page margins, or the first page dimension of the electronic document, and moving the tab to the second tab position, wherein the text position and the alignment property of the content are preserved after moving the tab to the second tab position;

wherein the text position and the alignment property of the content are preserved after moving the tab to the second tab position, and dynamically modifying the second tab position in response to moving the content to one of a column, table cell, a text box, and another page.

12. The computer-implemented method of claim 11, further comprising:

dynamically modifying the second tab position in response to a change of a content of the paragraph.

13. The computer-implemented method of claim 12, whereby at least one of:

a left margin of the page and the indent of the paragraph provide a reference point for the second tab position such that the text position and the alignment property of the content are preserved in the electronic document.

14. The computer-implemented method of claim 11, further comprising:

carrying over the second tab position to a new line, if content is added before the second tab position such that a right margin of the page is reached.

15. The computer-implemented method of claim 11, whereby the tab includes one of: a dynamically left-aligned tab, a dynamically center-aligned tab, and a dynamically right-aligned tab.

16. The computer-implemented method of claim 11, whereby the content includes at least one of: text, an image, and an object.

* * * * *